United States Patent Office 2,816,886
Patented Dec. 17, 1957

2,816,886
DISAZO-DYESTUFFS

Erich Brenneisen, Hofheim am Taunus, and Richard Huhs and Arthur Siebert, Frankfurt am Main, Germany, assignors to Farbwerke Hoechst Aktiengesellschaft vormals Meister Lucius & Brüning, Frankfurt am Main, Germany, a corporation of Germany No Drawing. Application July 19, 1955,
Serial No. 523,108

Claims priority, application Germany July 26, 1954

6 Claims. (Cl. 260—160)

The present invention relates to valuable new disazo-dyestuffs; more particularly it relates to salts with organic bases of disazo-dyestuffs of the following general formula:

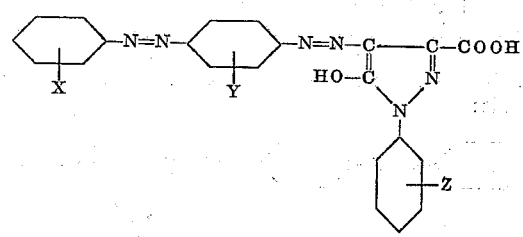

wherein X and Y represent hydrogen atoms, methyl or carboxylic acid groups, and Z represents a hydrogen atom or a sulfonic acid group.

The new azo-dyestuffs dye yellow to orange tints and are distinguished by their very good fastness to light and good solubility in organic solvents. They are made in accordance with the invention by reacting with an organic base a disazo-dyestuff obtainable by coupling diazotized 4-amino-1,1'-azobenzene which may be substituted by methyl and/or carboxylic acid groups in such a manner that each benzene nucleus contains only one of these substituents, with a 1-phenyl-5-pyrazolone-3-carboxylic acid which may contain a sulfonic acid group in the phenyl nucleus.

The dyestuffs of this invention are only sparingly soluble or insoluble in water. They are, however, readily soluble in organic solvents, such as methanol, ethanol, butanol, methyl acetate, methyl glycol, ethyl glycol or diacetone alcohol, and are, therefore, especially suitable for coloring lacquers, such as alcohol lacquers and the products marketed under the names "Cellon" lacquers and "Zapon" lacquers. Furthermore, they are suitable for coloring polymers, copolymers and condensation products, which are usually applied for lacquering foils. The new dyestuffs can also be used with advantage for coloring wood staining compositions, Celluloid and for the production of offset printing colors.

In German Patent No. 469,179 it is stated that dyestuffs, which are soluble in organic solvents, can be produced by converting acid or substantive textile dyestuffs which contain one or more carboxylic acid or sulfonic acid groups, into their salts with diaryl or polyaryl- or aralkyl-guanidines.

Furthermore, it has been proposed to react other organic bases, such as dicyclohexylamine, methyl-dicyclohexylamine, tetramethyl-diamino-dibenzyl sulfone, hexahydroaniline, quinoline, methyl-ethyl-hexahydropyridine, 2-methyl-benzimidazole, 2-amino-benzimidazole, 2-amino-perimidine, 2-toluido-4,5-dihydro-imidazole, tri-substituted melamines, diethyl-alpha- or β-naphthylamine, 3-amino-ethylcarbazole and the like, with organic dyestuffs containing acid salt forming groups (cf. German Patents Nos. 561,338 and 533,871). By the reaction with the organic bases the parent dyestuffs are rendered soluble in organic solvents and can then be used for coloring, for example, "Zapon" lacquers.

As compared with the dyestuffs disclosed in the aforesaid patents, the pyrazolone-azo-dyestuffs of the present invention, which contain as diazo-component the 4-amino-1,1'-azobenzene or the methyl- or carboxylic acid derivatives thereof, are distinguished by a substantially better fastness to light.

The folowing examples serve to illustrate the invention, but they are not intended to limit it thereto, the parts being by weight unless otherwise stated and the relationship of parts by weight to parts by volume being the same as that of the kilogram to the liter:

Example 1

19.7 parts of 4-amino-1,1'-azobenzene are stirred with 63 parts by volume of 5 N-hydrochloric acid and 200 parts by volume of water and, while adding ice, diazotized at 3–5° C. with 20 parts by volume of a 5 N-sodium nitrite solution. Stirring is continued for a further 1–2 hours.

The filtered diazo-solution is then run, while stirring, into a solution of 29.2 parts of 1-(2'-sulfophenyl)-5-pyrazolone-3-carboxylic acid of 100 percent strength, 200 parts by volume of water and 25 parts of calcined sodium carbonate. The coupling temperature is kept between 0 and 5° C. Stirring is continued for a further 3–5 hours and the mixture is filtered off. The isolated wet dyestuff so obtained is dissolved at 50–60° C. in a mixture of about 1000 parts by volume of water and 100 parts by volume of 2 N-sulfuric acid. 440 parts by volume of a 0.5 N-dicyclohexylamine sulfate solution are then run at a temperature below 40° C., while stirring well, into the filtered dyestuff solution. Stirring is continued for a further 6–8 hours and the product which has precipitated is filtered off and dried. The yellowish orange dyestuff so obtained dissolves readily in organic solvents, alcohol lacquers and "Zapon" lacquers and is distinguished by a very good fastness to light. It represents the dicyclohexylamine salt of the dyestuff of the following formula:

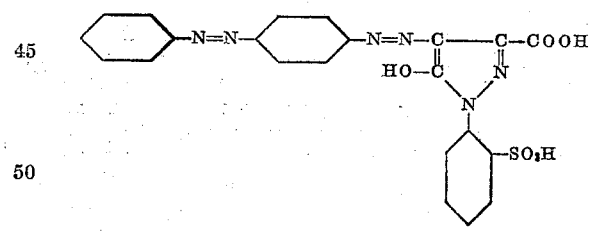

When the dicyclohexylamine sulfate is replaced by dodecylamine sulfate, diphenyl-guanidine hydrochloride, di-ortho-tolyl-guanidine hydrochloride, guanidine thiocyanate, aniline hydrochloride or benzylamine hydrochloride, the corresponding dyestuff salts are obtained. They are hardly distinguished from each other with regard to their tints and, likewise, possess an excellent fastness to light.

Example 2

19.7 parts of 4-amino-1,1'-azobenzene are diazotized as described in Example 1. The diazo-solution, after being clarified with kieselguhr, is run, while stirring, into a solution of 29.2 parts of 1-(4'-sulfophenyl)-5-pyrazolone-3-carboxylic acid of 100 percent strength, 200 parts by volume of water and 25 parts of calcined sodium carbonate. The coupling temperature is kept between 0 and 5° C. Stirring is continued for a further 3–5 hours and the mixture is filtered off. The dicyclohexylamine salt of the disazo-dyestuff so obtained is prepared as described in Example 1. An orange colored product is obtained which dissolves readily in organic solvents and possesses an excellent fastness to light.

Example 3

26.2 parts of 4-amino-3,2'-dimethyl-1,1'-azobenzene hydrochloride are stirred with 300 parts by volume of water and 45 parts by volume of 5 N-hydrochloric acid, and, while adding ice, diazotized at 5–7° C. with 20 parts by volume of a 5 N-sodium nitrite solution. Stirring is continued for about 1 hour.

The filtered diazo-solution is then run, while stirring, into a solution of 29.2 parts of 1-(2'-sulfophenyl)-5-pyrazolone-3-carboxylic acid of 100 percent strength, 200 parts by volume of water and 25 parts of calcined sodium carbonate. The coupling temperature is kept between 0 and 5° C. Stirring is continued for a further 1–2 hours and the dyestuffff is slowly salted out by the addition of 150 parts of sodium chloride. Stirring is continued for a further 2–3 hours. The precipitated wet dyestuff is then dissolved in 1000 parts by volume of hot water. 440 parts by volume of a 0.5 N-dicyclohexylamine sulfate solution are run at 18–20° C., while stirring well, into the dyestuff solution clarified with kieselguhr. Stirring is continued for about 8 hours and the dyestuff salt which has precipitated is filtered off and dried. It is an orange-colored powder and has a very good fastness to light.

Example 4

26.3 parts of the sodium salt of 4-amino-1,1'-azobenzene-4'-carboxylic acid are dissolved in 200 parts by volume of warm water and then filtered. The filtered solution is mixed with 20 parts by volume of a 5 N-sodium nitrite solution and then run, while stirring rapidly, into 65 parts by volume of 5 N-hydrochloric acid cooled to 0–5° C. by the addition of ice. Stirring is continued for about 1 hour.

The diazo-compound separates and is then added, while stirring, in the form of an acid aqueous suspension to a solution prepared from 29.2 parts of 1-(2'-sulfophenyl)-5-pyrazolone-3-carboxylic acid of 100 percent strength, 200 parts by volume of water and 25 parts of calcined sodium carbonate. The coupling temperature is kept at 3–5° C. Stirring is continued for a further 2–3 hours and the dyestuff is precipitated by adding a small quantity of 2 N-sulfuric acid. The precipitated dyestuff is dissolved in 1500 parts by volume of hot water to which has been added a small quantity of 2 N-sodium hydroxide solution, so that a weakly alkaline reaction is obtained and the solution is clarified with kieselguhr. The clarified dyestuff solution is then cooled to about 18° C. by the addition of ice and, while stirring well, 660 parts by volume of a 0.5 N-dicyclohexylamine sulfate solution are run into this solution. Stirring is continued for about 8 hours and the product which has precipitated is isolated and dried. An orange colored powder is obtained which dissolves in organic solvents, alcohol and "Zapon" lacquers and possesses an excellent fastness to light.

Example 5

19.7 parts of 4-amino-1,1'-azobenzene are stirred with 63 parts by volume of 5 N-hydrochloric acid and 200 parts by volume of water and, while adding ice, diazotized at 3–5° C. with 20 parts by volume of a 5 N-sodium nitrite solution. Stirring is continued for a further 1–2 hours. The filtered diazo-solution is then run, while stirring, into a solution prepared from 21.0 parts of 1-phenyl-5-pyrazolone-3-carboxylic acid of 100 percent strength, 400 parts by volume of water, 50 parts by volume of 2 N-sodium hydroxide solution and 100 parts by volume of a sodium carbonate solution of 20 percent strength. The coupling temperature is kept at 3–5° C. by the addition of ice. Stirring is continued for some hours and the dyestuff precipitates completely. The precipitated dyestuff is dissolved in 2000 parts by volume of hot water to which have been added 5 parts by volume of 10 N-sodium hydroxide solution and the solution is filtered off. The hot dyestuff solution is then added, while stirring well, to 400 parts by volume of a 5 N-diphenyl-guanidine hydrochloride solution. Stirring is then continued for a further 8–10 hours. The orange-colored dyestuff salt so obtained has a very good fastness to light.

We claim:

1. Salts with organic bases of disazo-dyestuffs corresponding to the general formula:

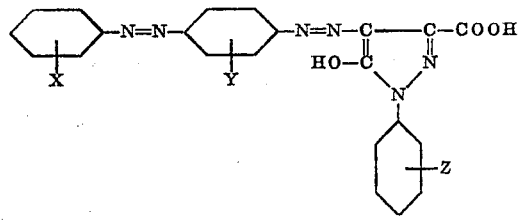

wherein X and Y stand for members of the group consisting of hydrogen, methyl and the carboxylic acid group, and Z represents a member of the group consisting of hydrogen and the sulfonic acid group.

2. The dicyclohexylamine salt of the dyestuff of the formula:

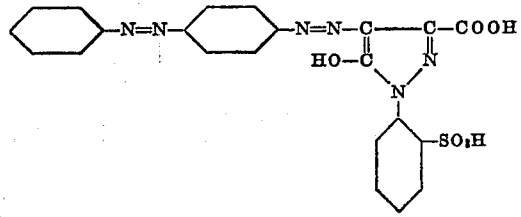

3. The dicyclohexylamine salt of the dyestuff of the formula:

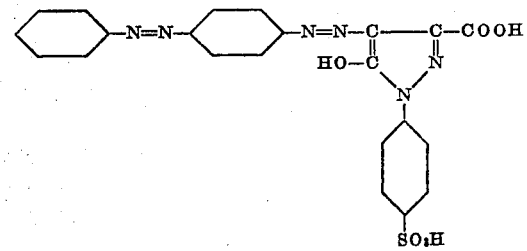

4. The dicyclohexylamine salt of the dyestuff of the formula:

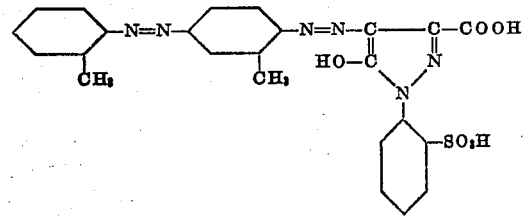

5. The dicyclohexylamine salt of the dyestuff of the formula:

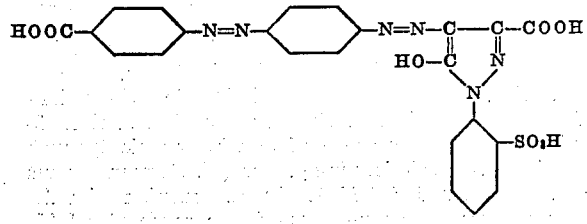

6. The diphenyl-guanidine salt of the dyestuff of the formula:
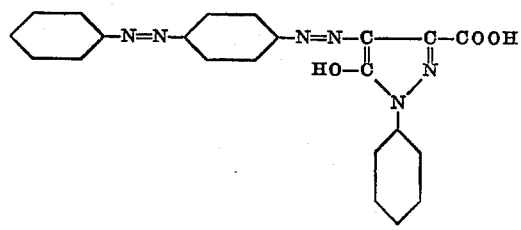
References Cited in the file of this patent
UNITED STATES PATENTS
| | | |
|---|---|---|
| 1,674,128 | Rose | June 19, 1928 |
| 1,800,300 | Kranzlein et al. | Apr. 14, 1931 |
| 1,828,599 | Montmollin et al. | Oct. 20, 1931 |
| 1,847,022 | Schmid | Feb. 23, 1932 |
| 2,038,298 | Kiernan | Apr. 21, 1936 |
OTHER REFERENCES
Venkataraman: Synthetic Dyes, vol. II, 1952, page 1208.